No. 646,798. Patented Apr. 3, 1900.
E. J. BROOKS.
SEAL.
(Application filed Feb. 21, 1900.)
(No Model.)
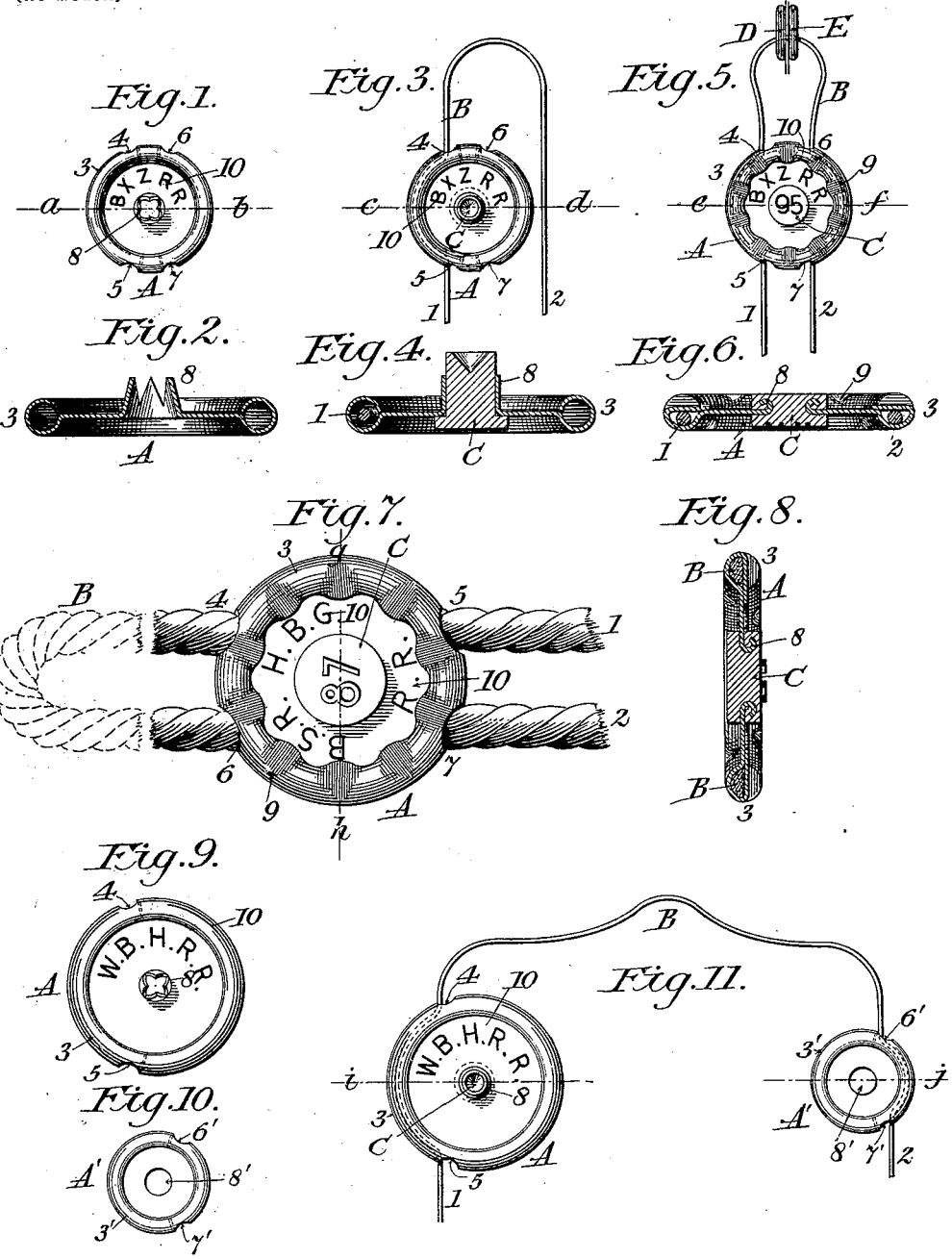
Witnesses: 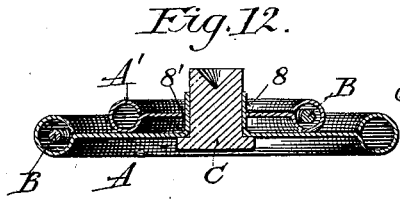 Inventor.
Edward J. Brooks,
THE NORRIS PETERS CO., PHOTO-LITHO., WASHINGTON, D. C.

UNITED STATES PATENT OFFICE.

EDWARD J. BROOKS, OF EAST ORANGE, NEW JERSEY.

SEAL.

SPECIFICATION forming part of Letters Patent No. 646,798, dated April 3, 1900.

Application filed February 21, 1900. Serial No. 6,123. (No model.)

*To all whom it may concern:*

Be it known that I, EDWARD J. BROOKS, a citizen of the United States of America, and a resident of East Orange, in the State of New Jersey, have invented a new and useful Improvement in Seals, of which the following is a specification.

This invention relates to those press-fastened seals characterized by a disk or disks of sheet metal for uniting the ends of a flexible shackle, which in the improved seal may be either of wire or of cord.

The present invention consists in novel means for preliminarily-attaching the disk or disks to the shackle at the factory with less expense than heretofore, and in like means for inclosing the other shackle end in a single-disk seal and holding the same preliminary to applying the seal-press, the improved seal being preferably and conveniently provided with a supplemental seal part of lead in the form of a rivet adapted to receive a serial number or other station or press mark at the pressing operation.

A sheet of drawings accompanies this specification as part thereof.

Figure 1 of the drawings is a face view of the sheet-metal disk of a single-disk seal constructed according to this invention; and Fig. 2, a section on the line *a b*, Fig. 1, enlarged one diameter. Fig. 3 is a face view of said seal as it leaves the factory; and Fig. 4, an enlarged section on the line *c d*, Fig. 3. Fig. 5 is a face view of the pressed seal; and Fig. 6, an enlarged section on the line *e f*, Fig. 5. Fig. 7 is a face view of a pressed cording seal of like construction; and Fig. 8, a section on the line *g h*, Fig. 7. Figs. 9 and 10 are face views of the disks of a two-disk seal embodying the same improvement in part. Fig. 11 is a face view of this seal as it leaves the factory; and Fig. 12 is an enlarged section through the two disks and the respective ends of the shackle on the line *i j*, Fig. 11, with the parts brought together preparatory to applying the seal-press.

Like reference letters and numbers indicate corresponding parts in all the figures.

The improved seal in either of the forms shown in the drawings comprises a sheet-metal seal-disk A, a flexible shackle B, and a supplemental rivet-shaped seal part C and is designed to be used in connection with car-door staples D and E, Fig. 5, or the like and fastened by means of a suitable seal-press in common with other press-fastened seals.

Of the two shackle-ends 1 and 2 new means for preliminarily attaching the disk A to said shackle end 1, as in Figs. 3 and 4, are the leading characteristics of the improved seal. The peculiar construction is confined to the disk A. This is preferably and conveniently round, as heretofore, and has a tubular rim 3, provided with a pair of openings 4 and 5, for the admission and escape of the extremity of said shackle end 1 into and out of the interior of the tubular rim. The curved passage formed by the interior of the rim 3 between said openings 4 and 5 and the two openings themselves afford sufficient friction when the disk is thus threaded to securely attach the disk to the shackle for shipment and handling without the preliminary fastening which has heretofore been necessary as a distinct operation in the manufacture of seals of the same class.

The species represented by Figs. 1 to 6, inclusive, is an improvement on my seal patented August 8, 1899, by United States Letters Patent No. 630,321. In this form a second pair of openings 6 and 7 provide for threading the second shackle end 2 in the same manner as the first preliminary to applying the seal-press, and the accidental displacement of said second shackle end during the pressing operation is thus prevented. A central eyelet-collar 8, conveniently formed by punching in the act of shaping the disk A, admits the stem of the rivet-shaped seal part C and holds the same securely enough to prevent accidental separation, and this seal part C conveniently receives a legible serial number, as in Figs. 5 and 6, or other station or press-mark, as aforesaid, in the act of press-fastening the shackle ends. This latter is done by a sufficient number of indentations 9, Figs. 5 and 6, crossing the tubular rim 3 and collapsing the same upon both shackle ends. Permanent marks 10, carried by the disk A, occupy the annular field within the rim 3 and are exposed to view around the stamped seal part C, as in Fig. 5.

A shackle B, of single annealed wire, as heretofore employed in seals of this class, is represented in Figs. 3 to 6. In the improved seal the seal-disk A and seal part C, as above described, may be combined in like manner with a shackle B of suitable "cord," as in Figs. 7 and 8, without any change except, if need be, as to size.

The species represented by Figs. 9 to 12, inclusive, is an improvement on my seal patented August 14, 1894, by United States Letters Patent No. 524,675. In this form a pair of sheet-metal disks A and A' are attached in one and the same manner to the respective shackle ends at the factory, the disk A being conveniently the larger, and constructed with a tubular rim 3, openings 4 and 5, eyelet-collar 8, and permanent marks 10, as above described, while the smaller disk A' is constructed with a like tubular rim 3', like openings 6' and 7', and a central opening 8', loosely fitted to the eyelet-collar 8. The disks A and A' are brought together, as in Fig. 12, for the pressing operation, and when the seal-press is applied the seal is fastened by simultaneously securing the two ends of the shackle B within the rims of the respective disks and permanently uniting the disks with each other by upsetting the stem of the seal part C, and therewith the eyelet-collar 8, upon the disk A'.

The round form of disk stamped from tin scrap is preferred, because cheapest; but other equivalent shapes and other sheet metals may be used and other like modifications will suggest themselves to those skilled in the art.

Having thus described said improvement, I claim as my invention and desire to patent under this specification—

1. The combination with a flexible shackle of a sheet-metal seal-disk having a tubular rim provided with a pair of openings through which one end of the shackle is threaded into and out of the interior of said rim to frictionally attach the disk.

2. The combination with a flexible shackle of a sheet-metal seal-disk having a tubular rim provided with a pair of openings through which one end of the shackle is threaded into and out of the interior of said rim to frictionally attach the disk and a second pair of openings to provide for threading the other end of the shackle in like manner preliminary to applying the seal-press to fasten the shackle ends.

EDWARD J. BROOKS.

Witnesses:
THOMAS TIERNEY,
F. W. LIVESEY.